United States Patent
Billmers et al.

(10) Patent No.: US 8,184,270 B1
(45) Date of Patent: May 22, 2012

(54) SYSTEM FOR VIEWING AN OBJECT IN A VISUALLY OBSCURED ENVIRONMENT AND METHOD OF USE

(76) Inventors: Richard I. Billmers, Langhorne, PA (US); Elizabeth J. Billmers, Langhorne, PA (US); Mary E. Ludwig, Hellertown, PA (US)

(*) Notice: Subject to any disclaimer, the term of this patent is extended or adjusted under 35 U.S.C. 154(b) by 564 days.

(21) Appl. No.: 12/454,752

(22) Filed: May 22, 2009

Related U.S. Application Data

(63) Continuation-in-part of application No. 10/818,148, filed on Apr. 5, 2004, now Pat. No. 7,561,255, which is a continuation-in-part of application No. 10/417,550, filed on Apr. 17, 2003, now Pat. No. 6,724,467.

(60) Provisional application No. 60/373,853, filed on Apr. 19, 2002.

(51) Int. Cl.
*G01C 3/08* (2006.01)

(52) U.S. Cl. ............... 356/5.04; 356/3.01; 356/4.01; 356/5.01; 356/5.1

(58) Field of Classification Search ........ 356/3.01–3.15, 356/4.01–4.4, 5.01–5.15, 6–22, 28, 28.5
See application file for complete search history.

(56) References Cited

U.S. PATENT DOCUMENTS
7,787,131 B1 * 8/2010 Moran ............... 356/520
* cited by examiner

*Primary Examiner* — Luke Ratcliffe
(74) *Attorney, Agent, or Firm* — Ted Masters

(57) ABSTRACT

A system and method for viewing an object in a visually obscured environment includes a laser for generating a beam of light which is directed at the object. A pulse generator generates a reference pulse which triggers the laser and also a triggers a range generator which generates a range window positioned at a desired range. A gated optical detector (1) receives reflected light from the object, (2) receives the range window from the range generator, and (3) produces a gated optical output which contains reflections from ranges corresponding with the range window. A display is connected to the gated optical detector for displaying the gated optical output. In one embodiment, the transmitted light beam is polarized, and the received light beam passes through a selectable polarizing filter. In another embodiment, a plurality of received reflected light returns are integrated into a combined image.

31 Claims, 3 Drawing Sheets

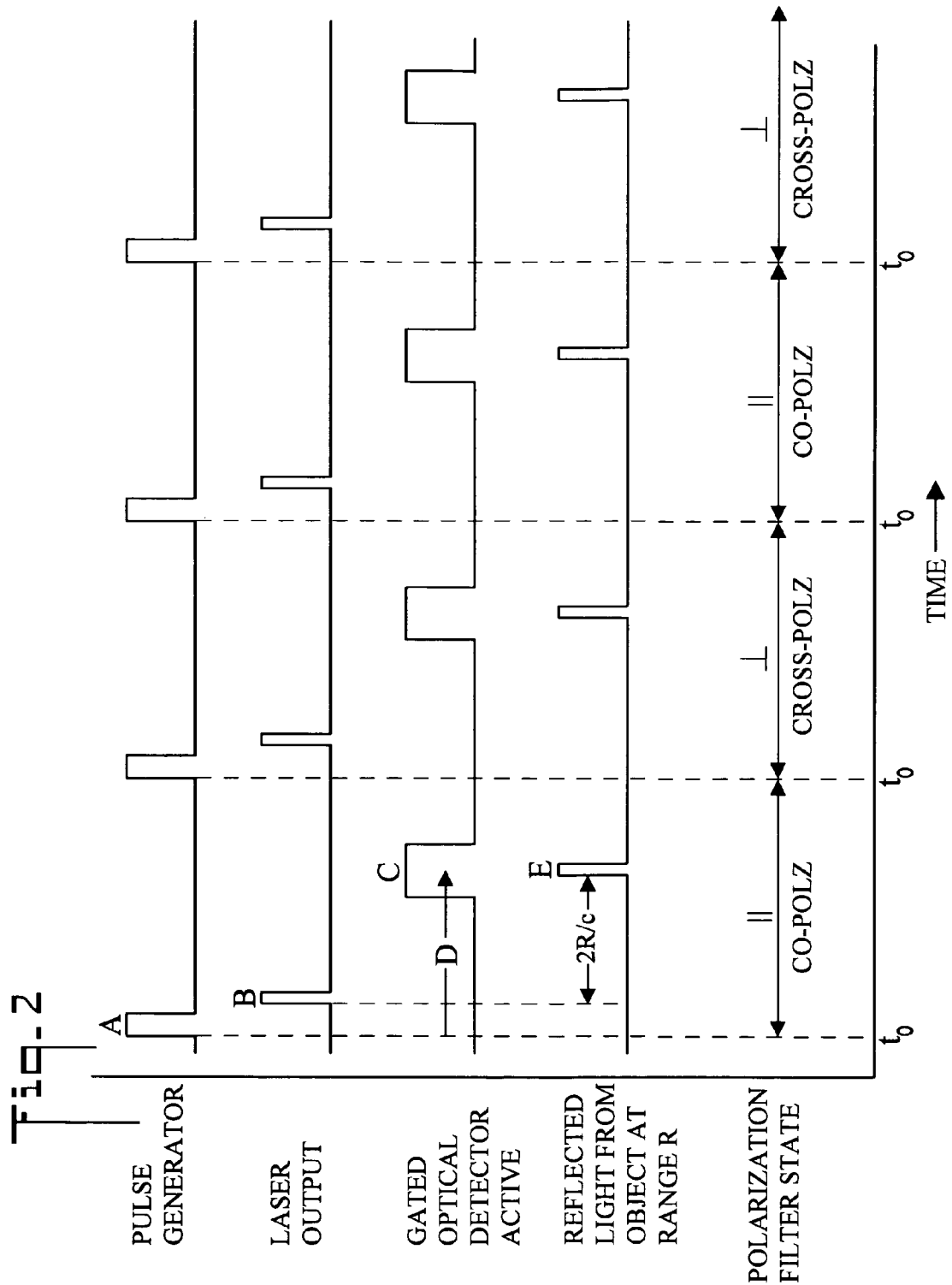

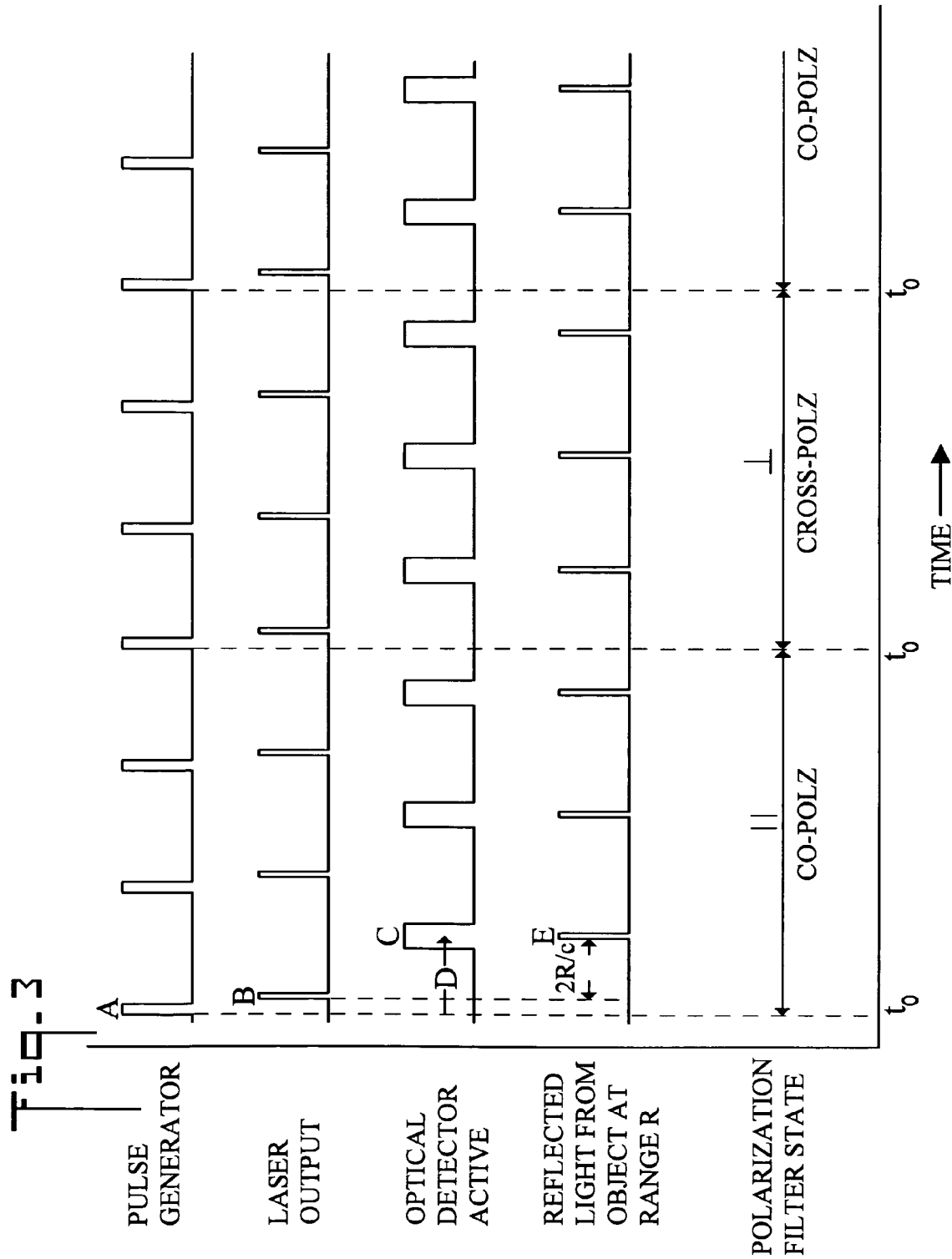

SYSTEM FOR VIEWING AN OBJECT IN A VISUALLY OBSCURED ENVIRONMENT AND METHOD OF USE

CROSS REFERENCE TO RELATED APPLICATION

This application is a Continuation in Part of and claims the filing priority of U.S. application Ser. No. 10/818,148 filed Apr. 5, 2004 now U.S. Pat. No. 7,561,255, which is a Continuation in Part of and claims the filing priority of U.S. application Ser. No. 10/417,550 filed Apr. 17, 2003 (now U.S. Pat. No. 6,724,467) which claims the filing priority of Provisional Application 60/373,853 filed Apr. 19, 2002, all of which previously filed applications are hereby incorporated by reference.

TECHNICAL FIELD

The present invention pertains generally to systems for viewing distant objects, and more particularly to a system and method for viewing an object in a visually obscured environment such as fog, rain, sleet, hail, snow, haze, smoke, and the like.

BACKGROUND OF THE INVENTION

Visualization through common obscurants such as fog, rain, smoke and haze represents a difficulty in many fields, including for example commercial aviation, transportation and shipping, military surveillance and targeting systems. Current imaging technology relies on light amplification, thermal imaging, digital image processing and various combinations of these and related technologies to increase visualization through various obscurants. The inherent limitation of these technologies is related to their ability to utilize only the visual data that they can acquire, as they are for the most part passive. Current active systems (systems which provide illumination) operate at a wavelength that is not eye-safe, which significantly restricts their application areas.

BRIEF SUMMARY OF THE INVENTION

The present invention is directed to a system for viewing objects which are visually obscured. The present invention provides long range imaging (up to 10 km) in a diverse range of obscurant media. The present invention uses a variety of means to enhance imaging in obscured environments. Near infrared laser illumination is chosen to reduce scattering by obscuring aerosols, which commonly have particle sizes smaller than the laser wavelength. A spectral filter is used to reduce captured light that does not originate from the laser source. Gating the imager allows only light returned from a certain range to be captured, thus eliminating near-field backscattered noise. Polarization discrimination is used to enhance the contrast of returned signals from certain types of targets. Multi-return integration allows the system to be more sensitive to laser returns while minimizing the integrated noise at the sensor.

The system can be installed on an aircraft (or on the ground), and easily integrated with a database of common object types for identification of hard targets, such as obstacles on a runway. Range to the target, target size, and motion of the target can be reported to a pilot or command center. Illuminated near infra-red (IR) imagery is ideal for providing images of hard targets, as object detail is very near that seen with a visible camera, unlike FLIR (forward-looking infrared) imagery, and the performance is equivalent in day or night conditions.

An additional application of interest is the ability to determine the phase of water droplets in clouds (liquid droplets vs. ice crystals). Certain cloud conditions present an icing hazard for aircraft, which, if detected in advance, could be avoided. To this end, the present invention includes elements for detecting and discriminating the polarization of return signals. The polarization discriminating optical system and accompanying image processing software are capable of differentiating highly depolarizing surfaces from those that contribute little to depolarization. Examples of this type of differentiation include water and ice phases in clouds and hard-target surfaces surrounded by an aerosol particulate media.

In accordance with a preferred embodiment of the invention, a system for viewing an object in a visually obscured environment includes a laser for generating a beam of light which is directed at the object. A pulse generator generates a reference pulse which triggers the laser. A transmit polarizer polarizes the beam of light generated by the laser. A range generator is also triggered by the pulse generator, wherein the range generator generates a range window positioned at a desired range. A changeable polarization filter receives light from the object, and only passes light of a given polarization. A gated optical detector (1) receives reflected light from the object passed by the polarization filter, (2) receives the range window from the range generator, and (3) produces a gated optical output which contains reflections from ranges corresponding with the range window. A display is connected to the gated optical detector for displaying the gated optical output of the gated optical detector.

In an aspect of the invention, the gated optical detector integrates a plurality of received reflected light returns from the object into one gated optical output.

Other aspects of the present invention will become apparent from the following detailed description, taken in conjunction with the accompanying drawings, which illustrate, by way of example, the principles of the invention.

BRIEF DESCRIPTION OF THE DRAWINGS

FIG. 2 is a diagram showing timing relationships within the system; and,

FIG. 3 is a diagram showing timing relationships in another embodiment of the system.

DETAILED DESCRIPTION OF THE INVENTION

Figure 1:
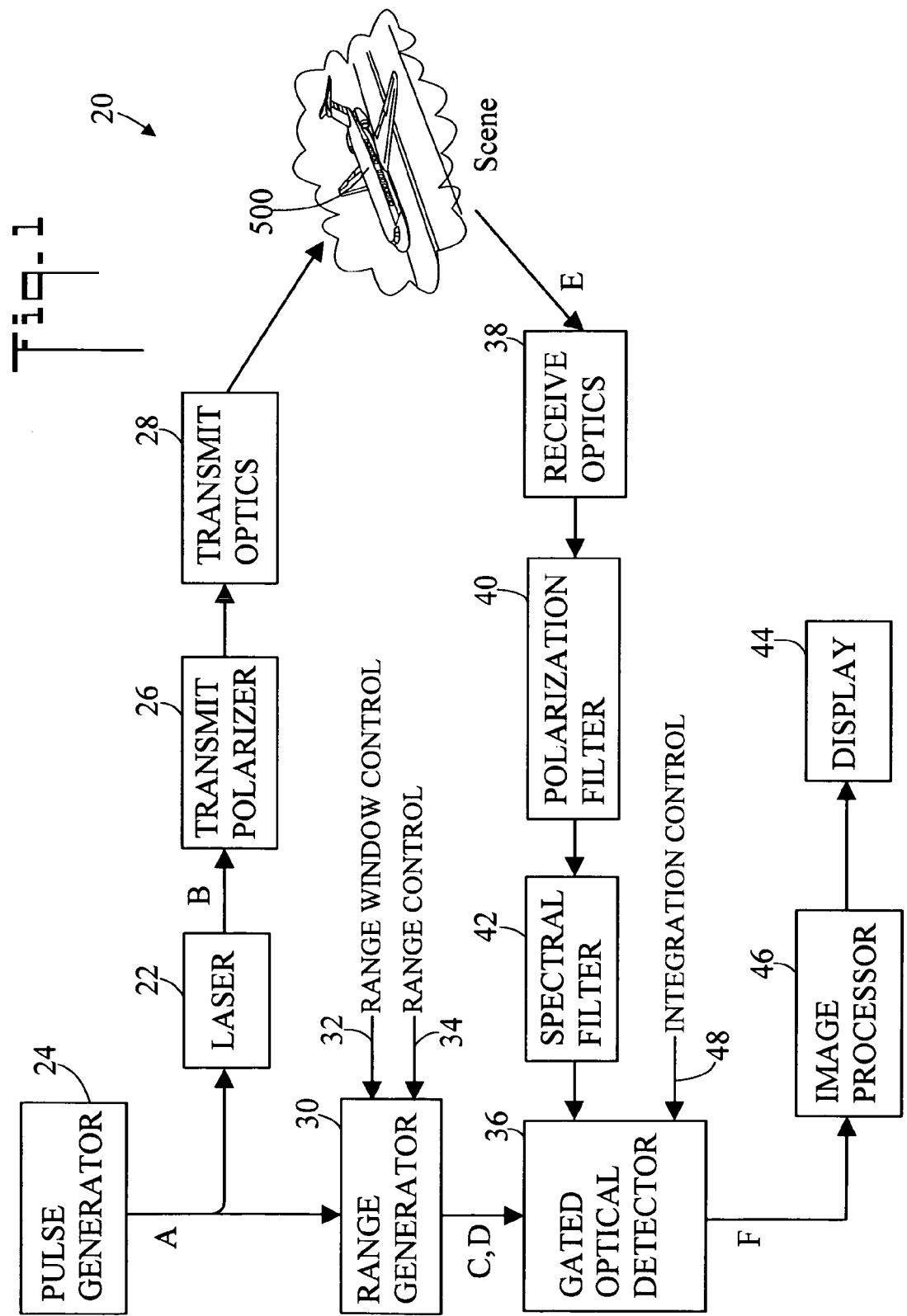
FIG. 1 is a block diagram of a system for viewing an object in a visually obscured environment in accordance with the present invention.

Referring initially to FIGS. 1 and 2, there are illustrated a block diagram of a system 20 for viewing an object(s) in a visually obscured environment in accordance with the present invention, and a diagram showing timing relationships within the system, respectively. The present invention is intended for viewing scenes at long range (up to 10 km) which may be visually obscured by various airborne media, such as fog, rain, sleet, hail, snow, haze, smoke, and the like. As shown in FIG. 1, an example application would be the scene of an object 500 such as an aircraft at a landing area obscured by fog. It is noted that in this example, system 20 could either be located on the ground and directed at the aircraft, or conversely located in the aircraft and directed at the ground. The scene is illuminated by light emitted from a laser source, and this light is reflected by object 500 in the scene (including hard targets and obscurant media) back to a gated optical detector. Light reflected by the obscurant media may be reflected in all directions, and is referred to as being 'scattered'. Light reflected from hard targets, such as metal or wood objects, or people, is generally reflected back in the direction from which it came.

System 20 includes a laser source 22 for generating a beam of light which is directed at object 500. Laser 22 emits a pulse of light B when triggered to do so by a pulse generator 24. Laser 22 is energized for a laser pulse width, which in an embodiment of the invention is less than 20 nanoseconds (ns). This narrow pulse width is necessary for system 20 to function properly in short range windows as is described below. The trigger may be one or a series of electrical inputs from pulse generator 24 which activates the laser firing mechanism. The firing mechanism may be the firing of a lamp or Q-switch (electro-optical device used to 'open' the laser cavity), a mechanical shutter opening, or some combination thereof. The emitted laser light B is directed at the scene, and may first be passed through a transmit polarizer 26 and transmit optics 28, both described below. The laser wavelength is chosen to be in the near infrared region, commonly defined as 750-3000 nanometers (nm), and more particularly in the about 1400 nm to about 1600 nm range for maximum eye safety. Many obscuring aerosols have particle sizes smaller than a near infrared laser wavelength, which results in reduced scattering compared to visible wavelengths (400-750 nm). The output of laser 22 B may be delayed by some time after the pulse generator 24 trigger is received (refer to FIG. 2). The amount of this delay depends upon the optics, electronics, and/or mechanics of the particular laser source 22.

Pulse generator 24 emits electronic reference pulses A for triggering both laser source 22 and a range generator 30 described below. The timing of and duration of the reference pulses A may be controlled via software or hardware manipulation. Pulse generator 24 will generally be configured to repeatedly generate the reference pulses A at some fixed frequency until manually or programmatically stopped. The characteristics of reference pulse A may be tailored to meet the specific requirements of the instruments receiving the pulse (amplitude, duration, rise time, etc.). Referring to FIG. 2, reference pulse A starts the operation sequence, and the start time of this pulse is designated as $t_o$.

Transmit polarizer 26 polarizes the beam of light generated by laser 22. In fact, transmit polarizer 26 may be used to either polarize the laser source 22 or modify its existing polarization. This polarizer 26 optic must be placed between the laser 22 and the scene being illuminated. Laser light will be incident on polarizer 26, and polarized light will be transmitted through it. Polarization may not be necessary if the polarization quality of the outgoing laser beam of light is already high (the beam is polarized mainly in one direction). The transmit polarizer 26 could receive an unpolarized input and transmits only light of a particular polarization; or alternatively be a half-wave plate. A half-wave plate is a birefringent optical crystal which splits incident light into two orthogonally polarized waves along its ordinary and extraordinary axes, and retards one wave by pi/2 relative to the other. The waves are recombined upon passing through the optic, forming a single polarized wave. This optic can be used to vary the polarization of incident light by rotating its axes. By changing the orientation of the transmit polarizer 26 (rotating it about the optical axis) the plane of polarization of incident light may be rotated. This type of polarizer may be used if a preference exists for a certain type of polarization incident on the scene, for example to match the orientation of the polarization selection device used on the return signal.

In the present invention, polarization discrimination is used to enhance the contrast of returned signals from certain types of objects 500 (targets). The illuminating light source has a known polarization. When this light is reflected back to the system by objects 500 at the scene, the returned light may be depolarized to some extent. It is known that hard objects 500 made of certain materials (metal, for instance) will depolarize incident light less than other 'natural' materials (such as foliage). When two images, each capturing different return signal polarizations from the same or similar scenes (may be slightly time shifted), are compared, objects 500 that tend to depolarize the incident light to different degrees can easily be distinguished. (example: detecting a vehicle in natural cover.)

Another application of this technique is to determine the phase of water droplets in clouds (liquid droplets vs. ice crystals). Liquid water droplets have a spherical shape, and tend to depolarize incident light only slightly, if at all. Ice crystals, which take on various shapes such as rods or polygons, tend to depolarize incident light to a high degree. Thus clouds containing ice crystals could be distinguished from those containing only water using the polarization discriminating of the present invention. This method is useful in detecting cloud conditions which present an icing hazard for aircraft.

In an embodiment of the invention, transmit optics 28 are disposed between laser 22 and object 500, and may be used to modify the laser beam as necessary for the particular application. These optics are be placed in the beam path so that light exiting laser 22 passes through them before being incident on the scene of interest. Transmit optics 28 may either be placed before or after (shown) transmit polarizer 26. Example types of transmit optics 28 that may be used include a spectral filter for altering the wavelength band of light emitted by laser 22; lenses to improve the collimation of the outgoing laser beam; or a spatial filter (combination of lenses with a small iris) to make the spatial profile of the outgoing beam more uniform. These examples are not meant to be restrictive, as numerous other modifications to the outgoing light beam could be performed.

System 20 further includes a range generator 30 which is also triggered by reference pulse A from pulse generator 24, and which provides an output to a gated optical detector 36. Range generator 30 generates a range window C which is positioned at a desired range D, which is usually the distance to an object 500 at the scene. In an embodiment of the invention, range window C will typically have a width of between about 50 ns and about 200 ns, providing an approximately 50-200 ft range interval of targets to be displayed on the imager. (based on the speed at which light travels, $3 \times 10^8$ m/s or 0.984 ft/ns.). The width and positioning of range window C may be adjusted by the system operator or by automated means, such as through a software interface. A range window control 32 allows range window C to be set to a desired width, and a range control 34 allows the range to be set to the desired range D. Range D may be of durations from several nanoseconds to a millisecond or so, depending on the target range of interest.

Range generator 30 receives (1) reference pulse A from pulse generator 24, (2) a system operator set desired range window C from range window control 32, and (3) a system operator set desired range D from range control 34. From these input values, range generator 30 generates range window C which is positioned at range D, the timing of which is shown in FIG. 2. Range window C is then routed to gated optical detector 36 where electronics provide the means of activating gated optical detector 36 for the programmed time period (that is during the time period range window C is high in FIG. 2). Range window C corresponds to a range interval within which objects 500 will be imaged. The output of range generator 30 can vary as a function of the gated optical detector 36 which is used. For example, a voltage may be output to activate a CCD or CMOS type sensor.

Light output by laser 22 will be returned to system 20 from objects at many different ranges R within the path of the laser beam propagation. The reflected light return E shown in FIG. 2 is from a particular object 500 at range R. The timing of this return is equal to 2*R/c, where R is the range to the object from the system, c is the speed of light, and a factor of 2 is necessary to account for the round-trip travel of the light. It is noted that this return time is referenced from the laser 22 output, not from $t_o$.

In an embodiment of the invention, receive optics 38 are disposed between object 500 and gated optical detector 36 (see discussion below). Light reflected from the scene (objects and obscurants) is incident upon receive optics 38. These optics may consist of elements such as a telescope for collecting light over a wide aperture, lenses for focusing light to gated optical detector 36, or lens combinations to improve image quality. Light is then passed through these optics to be incident upon a polarization filter 40.

Polarization filter 40 receives light from object 500, and only passes light of a given polarization. An optical means of polarization selection is used to separate returned signals by polarization orientation. This component could take several forms: a polarizing beam splitter could be used to send return signals of orthogonal polarizations to different imaging sensors; or an electrically switchable device could be used to pass different polarizations based on an applied current (such as a Pockels cell or liquid crystal device). In this case the differently polarized images would be different frames captured by a single imaging sensor. In the case shown in this figure, a switchable means is used where signals of different polarization are sent to a single detector based on the state of the switchable device. Polarization filter 40 can be triggered to switch via software or hardware a polarization sequence that is synchronized with the detector timing sequence. In an embodiment of the invention, polarization filter 40 is set to transmit alternating states of polarization, co-polarized or cross-polarized relative to the laser output, for each frame captured by the detector. In other words, polarization filter 40 alternates states of polarization relative to light beam B for each gated optical output F. It is important that the polarization passed be alternated each frame to minimize the time for potential changes in the scene being illuminated, since alternating frames will be directly compared.

Optionally a spectral filer 42 is disposed between object 500 and gated optical detector 36. Spectral filter 42 is used to reduce the spectral band of light incident on gated optical detector 36. All light received from object 500 is input through spectral filter 42, which may be located anywhere in the return optical train consisting of receive optics 38, polarization filter 40, and spectral filter 42. Incident light may include ambient light or stray light not transmitted by the laser or reflected by the scene. Typically spectral filter 42 is used to reject light outside of the laser bandwidth, with the filter passing a spectral bandwidth of about 3 nm to about 20 nm centered on the laser wavelength. Spectrally filtered light is output from the filter to optical detector 36. As on the transmit side, the relative optical train location of receive optics 38, polarization filter 40, and spectral filter 42, can be varied to best suit the particular application.

System 20 further includes gated optical detector 36 which (1) receives reflected light E from object 500 passed by polarization filter 40, (2) receives range window C from range generator 30, and (3) produces a gated optical output F which contains reflections from ranges corresponding with range window C. Gated optical detector 36 receives light which has been returned from the scene as well as electrical signals from the range generator 30 electronics. Gated optical detector 30 must be capable of being turned on and off in the period of time designated by range window C, which can be as short as 50 ns. In an embodiment of the invention, gated optical detector 36 is a high-speed camera system. An image or signal is output from gated optical detector 36 to a display 32, and can be optionally routed through an image processor 46.

If the optical detector were not gated, the return E would be comprised of an exponential decay with a small "bump" on it from the object. By using gated optical detector 36, unwanted scattering from the obscured environment is eliminated, and only the return from object 500 is detected. A particular object 500 may be specifically selected by adjusting the range window C and range D to correspond with the range and visual properties of the object 500. To generate a 3D image with depth information, system 20 can employ a variable time gate method. By sliding the range window C in time (that is by varying range D), a series of 2D images may be constructed into a 3D image with range information derived from the delay time used to create it.

Display 44 is connected to gated optical detector 36 for displaying gated optical output F of gated optical detector 36. In an embodiment of the invention, display 44 is either a black and white or color 2D display, such as a TV-type monitor. In another embodiment of the invention, an image processor 46 disposed between gated optical detector 36 and display 44. Display 44 takes a processed image from the software-controlled image processor 46, and displays the information for viewing by the operator. The image processing software compares two images, one of returned signal polarized parallel to the illuminating laser beam (co-polarized), and one of returns polarized orthogonally to the laser beam (cross-polarized). The intensity of different regions of these images are compared with the result being some knowledge of the depolarization characteristics of the objects in different regions of the scene being imaged. This information can be used to present an augmented image of objects with certain depolarization characteristics, or to draw attention to certain regions of a given scene. The results of the image processing are output to display 44.

It may be appreciated that system 20 can employ all of the above cited features, or alternatively can only employ certain of the features. Transmit polarizer 26, transmit optics 28, receive optics 38, polarization filter 40, spectral filter 42, image processor 46, and display 44 each can be eliminated from system 20 depending upon the particular application. Also, the polarization feature and the return light pulse integration feature (discussed below) may be used together or separately.

FIG. 2 is a diagram showing timing relationships within system 20 (also refer to FIG. 1). Pulse generator 24 emits reference pulse A, which triggers laser 22 causing the emission of beam of light B. Range generator 30 generates range window C at range D, and supplies these signals to gated optical detector 36 which is active when range window C is high. Only reflected light E from object 500 which is received during the presence of range window C is processed by gated optical detector 36. The co-polarized component and the cross-polarized component of reflected light E are passed on alternating cycles by polarization filter 40.

In terms of use, a method for viewing an object in a visually obscured environment includes: (refer to FIGS. 1 and 2).

(a) providing an object 500 disposed in a visually obscured environment;

(b) providing a system 20 for viewing object 500 in the visually obscured environment including;

a laser 22 for generating a beam of light B which is directed at object 500;

a pulse generator 24 for generating a reference pulse A which triggers laser 22;

a transmit polarizer 26 for polarizing the beam of light B generated by laser 22;

a range generator 30 which is also triggered by pulse generator 24, wherein range generator 30 generates a range window C positioned at a desired range D;

a range window control 32 for setting range window C to a desired width;

a range control 34 for setting the desired range D;

a polarization filter 40 which receives light E from object 500, and only passes light of a given polarization;

a gated optical detector 36 which (1) receives light passed by polarization filter 40, (2) receives range window C from range generator 30, and (3) produces a gated optical output F which contains reflections from ranges corresponding with range window C; and, a display 44 connected to gated optical detector 36 for displaying the gated optical output F of gated optical detector 36;

(c) directing beam of light B from laser 22 at object 500; and, (d) while viewing display 44, adjusting at least one of the range window control 32 and the range control 34 to obtain an optimum display of object 500.

FIG. 3 is a diagram showing timing relationships in another embodiment of system 20 (also refer to FIG. 1). In this embodiment, gated optical detector 36 integrates a plurality of received reflected light returns E from object 500 into gated optical output F. An integration control provides for setting the number of received light returns E which are integrated. Three inputs are integrated in FIG. 3, however the number could be higher or lower. No change in hardware configuration is required to implement this integration embodiment. The change is in the programming of the system electronics. In the FIG. 2 example, after each range window C period the electronics allow gated optical detector 36 to deliver a gated output signal to image processor 46. Conversely in the integration embodiment of FIG. 3, the electronics only allow gated optical detector 36 to deliver a gated output signal after the integration period, which in the shown example is three complete range window C cycles or frames. In FIG. 3 polarization filter 40 is set to alternating states of polarization, co-polarization or cross-polarized relative to the laser output B, for each frame captured by gated optical detector 36 (in the shown case each series of three reflected returns).

Note that the only times that gated optical detector 36 is active are those where the range window C signal is high in the timeline, which in this example would be a time period of 3*RW for each integration cycle. This approach allows the integration of successive reflected signals without the noise associated with longer detector integration times. For example, a pulse generator 24 firing at 10 Hz would trigger gated optical detector 36 three times in the space of 300 ms (3/10 sec). If the range window width is programmed to 100 ns, gated optical detector 36 would be activated for a total of 300 ns. Without gated integration, if gated optical detector 36 were to be activated over the full 300 ms period required to receive three reflected returns, the amount of dark noise integrated by gated optical detector 36 would be increased by a factor of $10^6$.

It is noted that in an embodiment of the invention, the integration embodiment of FIG. 3 can be used independently of the polarization embodiment (i.e. without transmit polarizer 26 and/or polarization filter 40).

In terms of use, a method for viewing an object in a visually obscured environment includes: (refer to FIGS. 1 and 3).

(a) providing an object 500 disposed in a visually obscured environment;

(b) providing a system 20 for viewing object 500 in the visually obscured environment including;

a laser 22 for generating a beam of light B which is directed at object 500;

a pulse generator 24 for generating a reference pulse A which triggers laser 22;

a range generator 30 which is also triggered by pulse generator 24, wherein range generator 30 generates a range window C positioned at a desired range D;

a range window control 32 for setting range window C to a desired width;

a range control 34 for setting the desired range D;

a gated optical detector 36 which (1) receives light passed by polarization filter 40, (2) receives range window C from range generator 30, and (3) produces a gated optical output F which contains reflections from ranges corresponding with range window C;

the gated optical detector 36 integrating a plurality of received reflected light returns E from object 500 into the gated optical output;

an integration control 48 for setting the number of received light returns which are integrated;

a display 44 connected to gated optical detector 36 for displaying the gated optical output F of gated optical detector 36;

(c) directing beam of light B from laser 22 at object 500; and, (d) while viewing display 44, adjusting integration control 48 to obtain an optimum display of object 500.

The method further including:

in step (b), further providing a range window control 32 for setting a range window C to a desired width, and a range control 34 for setting desired range D; and, in step (d), while viewing display 44, adjusting at least one of range window control 32 and range control 34 to obtain an optimum display of object 500.

The preferred embodiments of the invention described herein are exemplary and numerous modifications, variations, and rearrangements can be readily envisioned to achieve an equivalent result, all of which are intended to be embraced within the scope of the appended claims.

We claim:

1. A system for viewing an object in a visually obscured environment, comprising:

a laser for generating a beam of light which is directed at the object;

a pulse generator for generating a reference pulse which triggers said laser;

said laser emitting said beam of light when triggered by said pulse generator;

a transmit polarizer for polarizing said beam of light generated by said laser;

a range generator which is also triggered by said pulse generator, wherein said range generator generates a range window positioned at a desired range;

a polarization filter which receives reflected light from the object, and only passes light of a given polarization;

a gated optical detector which (1) receives reflected light from the object passed by said polarization filter, (2)

receives said range window from said range generator, and (3) produces a gated optical output which contains reflections from ranges corresponding with said range window; and,
a display connected to said gated optical detector for displaying said gated optical output of said gated optical detector.

2. The system according to claim 1, further including:
said laser having a wavelength of between about 1400 nm and about 1600 nm.

3. The system according to claim 1, further including:
said beam of light having a pulse width; and,
said pulse width being less than 20 ns.

4. The system according to claim 1, further including:
said range window having a width of between about 50 ns and about 500 ns.

5. The system according to claim 1, further including:
a range window control for setting said range window to a desired width.

6. The system according to claim 1, further including:
a range control for setting said desired range.

7. The system according to claim 1, further including:
transmit optics disposed between said laser and the object.

8. The system according to claim 1, further including:
receive optics disposed between the object and said gated optical detector.

9. The system according to claim 1, further including:
a spectral filer disposed between the object and said gated optical detector.

10. The system according to claim 9, further including:
said laser having a wavelength; and,
said spectral filter passing a spectral band of between about 3 nm and about 20 nm centered on said wavelength.

11. The system according to claim 1, further including:
an image processor disposed between said gated optical detector and said display.

12. The system according to claim 1, further including:
said gated optical detector integrating a plurality of received reflected light returns from the object into said gated optical output.

13. The system according to claim 12, further including:
an integration control for setting the number of received light returns which are integrated.

14. The system according to claim 1, further including:
said polarization filter alternating states of polarization relative to said light beam for each said gated optical output.

15. The system according to claim 1, further including:
said laser having a wavelength of between about 1400 nm and about 1600 nm;
said beam of light having a pulse width;
said pulse width being less than 20 ns;
said range window having a width of between about 50 ns and about 500 ns;
a range window control for setting said range window to a desired width;
a range control for setting said desired range;
transmit optics disposed between said laser and the object;
receive optics disposed between the object and said gated optical detector;
a spectral filer disposed between the object and said gated optical detector;
said laser having a wavelength;
said spectral filter passing a spectral band of between about 3 nm and about 20 nm centered on said wavelength;
an image processor disposed between said gated optical detector and said display; and,
said polarization filter alternating states of polarization relative to said light beam for each said gated optical output.

16. A method for viewing an object in a visually obscured environment, comprising:
(a) providing an object disposed in a visually obscured environment;
(b) providing a system for viewing said object in said visually obscured environment including;
a laser for generating a beam of light which is directed at the object;
a pulse generator for generating a reference pulse which triggers said laser;
a transmit polarizer for polarizing said beam of light generated by said laser;
a range generator which is also triggered by said pulse generator, wherein said range generator generates a range window positioned at a desired range;
a range window control for setting said range window to a desired width;
a range control for setting said desired range;
a polarization filter which receives reflected light from the object, and only passes light of a given polarization;
a gated optical detector which (1) receives light passed by said polarization filter, (2) receives said range window from said range generator, and (3) produces a gated optical output which contains reflections from ranges corresponding with said range window; and,
a display connected to said gated optical detector for displaying said gated optical output of said gated optical detector;
(c) causing said laser to emit a beam of light;
(d) directing said beam of light from said laser at said object; and,
(e) while viewing said display, adjusting at least one of said range window control and said range control to obtain an optimum display of said object.

17. A system for viewing an object in a visually obscured environment, comprising:
a laser for generating a beam of light which is directed at the object;
a pulse generator for generating a reference pulse which triggers said laser;
said laser emitting said beam of light when triggered by said pulse generator;
a range generator which is also triggered by said pulse generator, wherein said range generator generates a range window positioned at a desired range;
a gated optical detector which (1) receives reflected light from the object, (2) receives said range window from said range generator, (3) and produces a gated optical output which contains reflections from ranges corresponding with said range window;
said gated optical detector integrating a plurality of received reflected light returns from the object into said gated optical output, and,
a display connected to said gated optical detector for displaying said gated optical output of said gated optical detector.

18. The system according to claim 17, further including:
said laser having a wavelength of between about 1400 nm and about 1600 nm.

19. The system according to claim 17, further including:
said beam of light having a pulse width; and,
said pulse width being less than 20 ns.

20. The system according to claim 17, further including:
said range window having a width of between about 50 ns and about 500 ns.

21. The system according to claim 17, further including:
a range window control for setting said range window to a desired width.

22. The system according to claim 17, further including:
a range control for setting said desired range.

23. The system according to claim 17, further including:
transmit optics disposed between said laser and the object.

24. The system according to claim 17, further including:
receive optics disposed between the object and said gated optical detector.

25. The system according to claim 17, further including:
a spectral filer disposed between the object and said gated optical detector.

26. The system according to claim 25, further including:
said laser having a wavelength; and,
said spectral filter passing a spectral band of between about 3 nm and about 20 nm centered on said wavelength.

27. The system according to claim 17, further including:
an image processor disposed between said gated optical detector and said display.

28. The system according to claim 17, further including:
an integration control for setting the number of received light returns which are integrated.

29. The system according to claim 17, further including:
said laser having a wavelength of between about 1400 nm and about 1600 nm;
said beam of light having a pulse width;
said pulse width being less than 20 ns;
said range window having a width of between about 50 ns and about 500 ns;
a range window control for setting said range window to a desired width;
a range control for setting said desired range;
transmit optics disposed between said laser and the object;
receive optics disposed between the object and said gated optical detector;
a spectral filer disposed between the object and said gated optical detector;
said laser having a wavelength;
said spectral filter passing a spectral band of between about 3 nm and about 20 nm centered on said wavelength;
an image processor disposed between said gated optical detector and said display; and,
an integration control for setting the number of received light returns which are integrated.

30. A method for viewing an object in a visually obscured environment, comprising:
(a) providing an object disposed in a visually obscured environment;
(b) providing a system for viewing said object in said visually obscured environment including;
a laser for generating a beam of light which is directed at the object;
a pulse generator for generating a reference pulse which triggers said laser;
a range generator which is also triggered by said pulse generator, wherein said range generator generates a range window positioned at a desired range;
a gated optical detector which (1) receives reflected light from the object, (2) receives said range window from said range generator, and (3) produces a gated optical output which contains reflections from ranges corresponding with said range window;
said gated optical detector integrating a plurality of received reflected light returns from said object into said gated optical output;
an integration control for setting the number of received light returns which are integrated;
a display connected to said gated optical detector for displaying said gated optical output of said gated optical detector;
(c) causing said laser to emit a beam of light;
(d) directing said beam of light from said laser at said object; and,
(e) while viewing said display, adjusting said integration control to obtain an optimum display of said object.

31. The method of claim 30 further including:
in step (b), further providing a range window control for setting a range window to a desired width, and a range control for setting a desired range; and,
in step (e), while viewing said display, adjusting at least one of said range window control and said range control to obtain an optimum display of said object.

* * * * *

UNITED STATES PATENT AND TRADEMARK OFFICE
CERTIFICATE OF CORRECTION

| | |
|---|---|
| PATENT NO. | : 8,184,270 B1 |
| APPLICATION NO. | : 12/454752 |
| DATED | : May 22, 2012 |
| INVENTOR(S) | : Richard I. Billmers et al. |

It is certified that error appears in the above-identified patent and that said Letters Patent is hereby corrected as shown below:

In the Specification

Column 1, after line 17, insert the following section:
-- GOVERNMENT LICENSE RIGHTS This invention was made with Government support under Contract NNL08AA05C awarded by NASA. The Government has certain rights in this invention. --

Signed and Sealed this
Tenth Day of September, 2013

Teresa Stanek Rea
*Acting Director of the United States Patent and Trademark Office*